US011167324B2

(12) United States Patent
Davis et al.

(10) Patent No.: US 11,167,324 B2
(45) Date of Patent: Nov. 9, 2021

(54) FLOWBACK TANK CLEANING SYSTEM AND METHOD

(71) Applicant: OIL STATES ENERGY SERVICES, L.L.C., Houston, TX (US)

(72) Inventors: Brodey W. Davis, Tuttle, OK (US); Jay C. Robinson, Weatherford, OK (US); Brandon J. Crossley, Oklahoma City, OK (US); Corey L. Hobbs, Fort Cobb, OK (US); Johnny T. Gaulf, Edmond, OK (US); Billy C. Rowell, Duncan, OK (US)

(73) Assignee: OIL STATES ENERGY SERVICES, L.L.C., Houston, TX (US)

( * ) Notice: Subject to any disclaimer, the term of this patent is extended or adjusted under 35 U.S.C. 154(b) by 79 days.

(21) Appl. No.: 16/168,455

(22) Filed: Oct. 23, 2018

(65) Prior Publication Data

US 2019/0143380 A1 May 16, 2019

Related U.S. Application Data

(60) Provisional application No. 62/584,997, filed on Nov. 13, 2017.

(51) Int. Cl.
*B08B 3/04* (2006.01)
*B08B 3/12* (2006.01)
(Continued)

(52) U.S. Cl.
CPC .............. *B08B 3/042* (2013.01); *B08B 3/123* (2013.01); *B65G 33/10* (2013.01); *B65G 45/005* (2013.01);
(Continued)

(58) Field of Classification Search
CPC ......... B08B 3/042; B08B 3/123; B08B 9/093; B08B 2203/02; B65G 45/005;
(Continued)

(56) References Cited

U.S. PATENT DOCUMENTS 2,662,642 A 12/1953 Wilson
2,756,965 A 7/1956 Howe
(Continued)

OTHER PUBLICATIONS

Patent Cooperation Treaty; PCT/US2018/057121; International Search Report and Written Opinion; dated Feb. 14, 2019.

*Primary Examiner* — Natasha N Campbell
(74) *Attorney, Agent, or Firm* — Morgan, Lewis & Bockius LLP

(57) ABSTRACT

A flowback tank cleaning system and method is described. A flowback tank includes a self-cleaning system. A flowback tank cleaning method may include moving solid debris collected at a bottom of a collection section of a flowback tank towards a lift auger using a cleaning auger or a conveyer belt extending along a length of the collection section, the bottom of the collection section including an angled trough, funneling solid debris towards the cleaning auger or conveyor belt by placing the cleaning auger or conveyor belt at a base of the angled trough, spraying fluid downward through a series of fluid outlets, removing the sand so moved by the cleaning auger or conveyer belt from the flowback tank using the lift auger, and removing the fluid from the flowback tank using a drain manifold below the cleaning auger or conveyer belt.

7 Claims, 11 Drawing Sheets

(51) Int. Cl.
    *B65G 33/10*     (2006.01)
    *B65G 45/22*     (2006.01)
    *B65G 45/00*     (2006.01)
    *E21B 43/34*     (2006.01)
    *E21B 43/26*     (2006.01)

(52) U.S. Cl.
    CPC .............. *B65G 45/22* (2013.01); *E21B 43/34* (2013.01); *B08B 2203/02* (2013.01); *B65G 2201/045* (2013.01); *B65G 2812/0577* (2013.01); *E21B 43/26* (2013.01)

(58) Field of Classification Search
    CPC .. B65G 45/10; B65G 45/22; B65G 2201/045; B65G 2812/0577
    See application file for complete search history.

(56) References Cited

U.S. PATENT DOCUMENTS

| | | |
|---|---|---|
| 4,844,106 A | 7/1989 | Hunter et al. |
| 10,751,654 B1 | 8/2020 | Kulbeth |
| 2002/0134550 A1* | 9/2002 | Leeson ................ E21B 21/066 |
| | | 166/266 |
| 2013/0048575 A1* | 2/2013 | Gruber ...................... C02F 1/24 |
| | | 210/749 |
| 2013/0149081 A1 | 6/2013 | Noyes |
| 2014/0099177 A1 | 4/2014 | Steinke |
| 2014/0209312 A1 | 7/2014 | Munisteri |
| 2016/0256799 A1* | 9/2016 | Thompson ........... B01D 21/283 |
| 2016/0326021 A1 | 11/2016 | Schmitt et al. |
| 2017/0008046 A1* | 1/2017 | Harman .............. B05B 13/0627 |

* cited by examiner

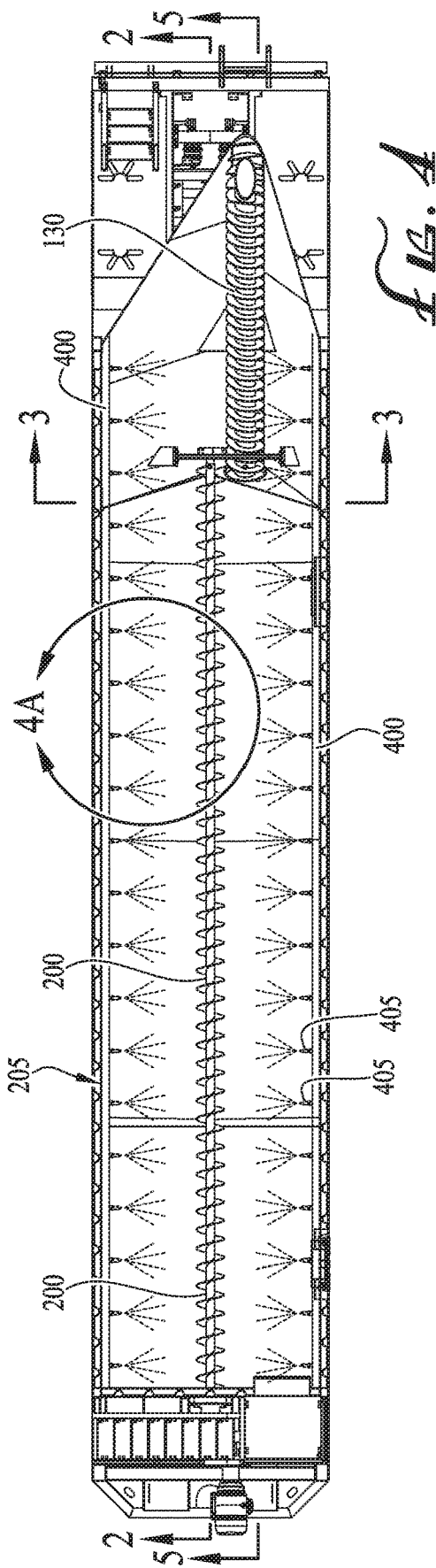
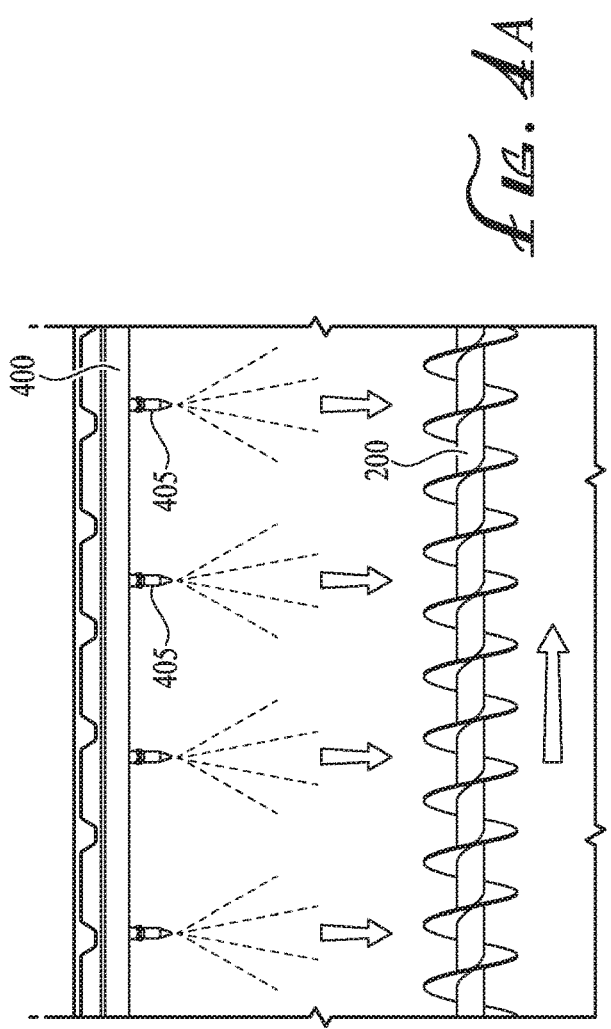

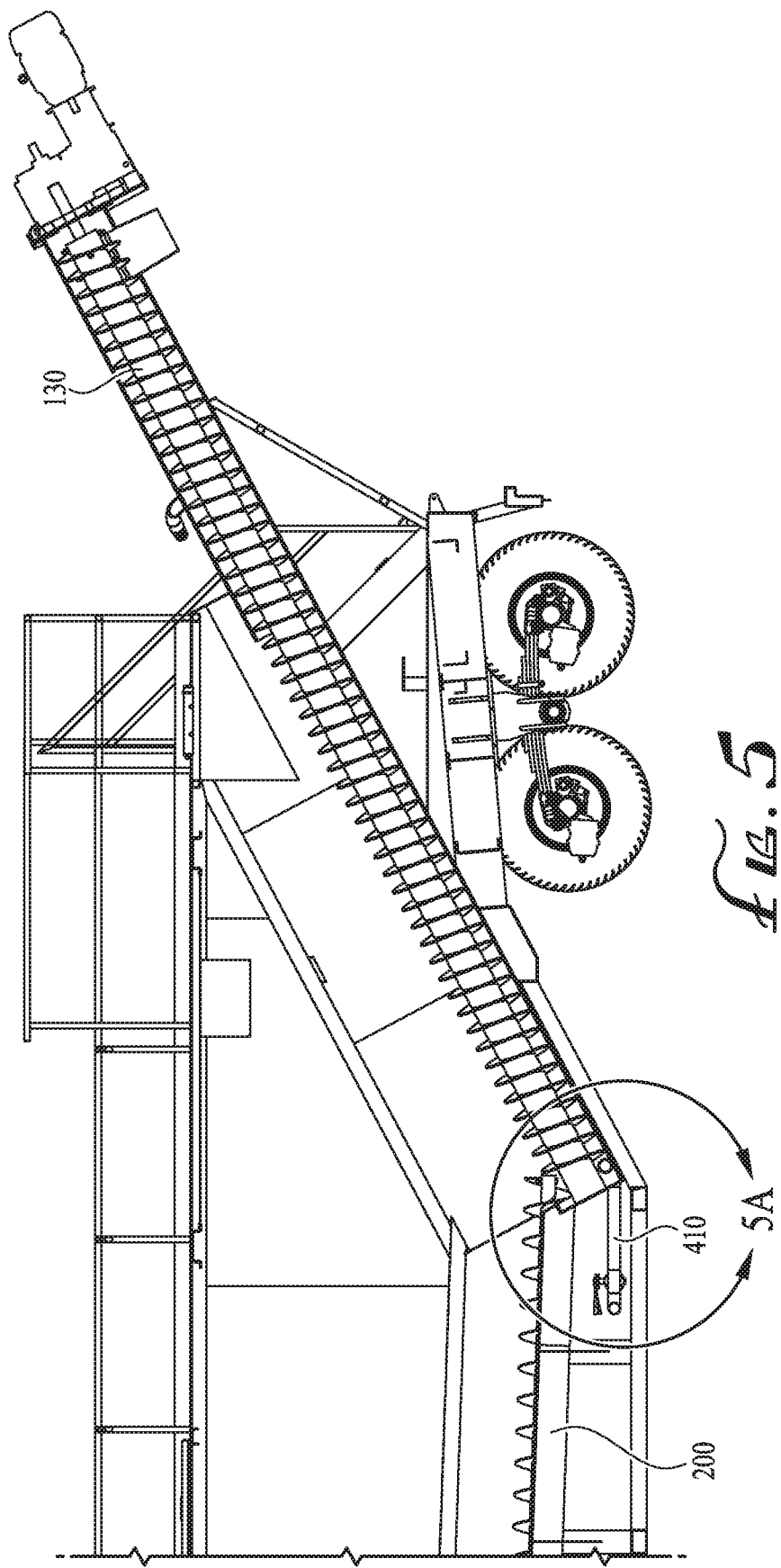

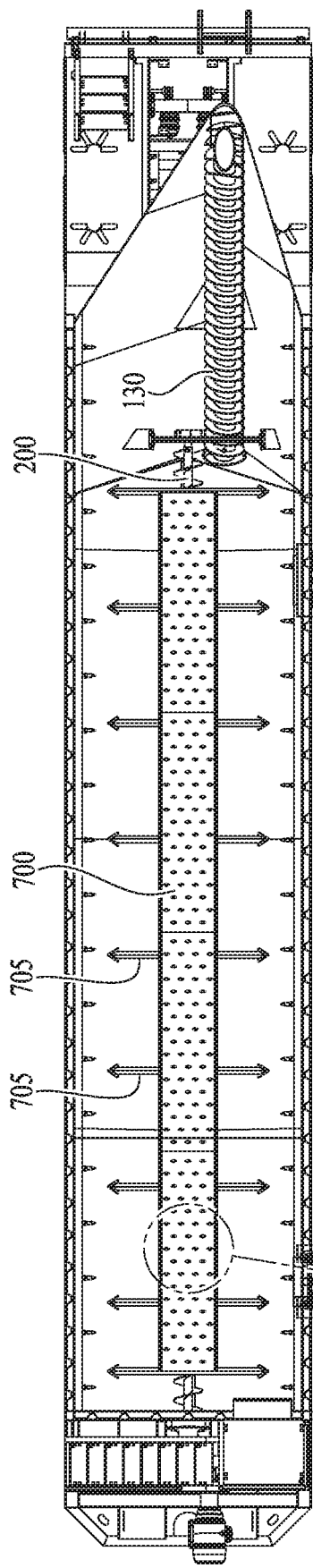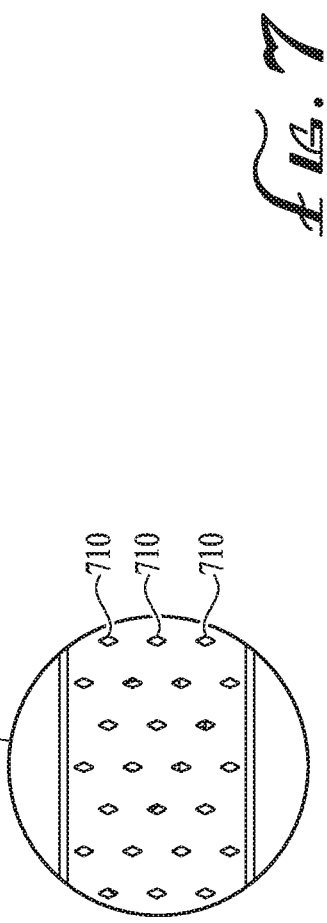
Fig. 7

FLOWBACK TANK CLEANING SYSTEM AND METHOD

BACKGROUND OF THE INVENTION

Field of the Invention

Embodiments of the invention described herein pertain to the field of hydraulic fracturing. More particularly, but not by way of limitation, one or more embodiments of the invention enable a flowback tank cleaning system and method.

Description of the Related Art

Fluid, such as natural gas, oil or water, is often located in underground formations. The oil, natural gas or other fluid is extracted from the underground formation in order to be separated, refined, distributed and/or sold. In low-permeability reservoirs such as shale formations, a treatment known as formation stimulation, hydraulic fracturing or "fracing" is often performed to stimulate well production. In hydraulic fracturing treatments, specially engineered fluids are pumped at high pressure and rate into the reservoir, creating a fracture in the surrounding rock formation. A proppant, such as sand, is mixed with the treatment fluid to keep the fracture open to allow hydrocarbons to flow into the wellbore once the hydraulic fracturing treatment is complete.

Following a hydraulic fracturing treatment, a portion of the fluid and proppant pumped into the well during hydraulic fracturing will flow back to the well surface. "Flowback" refers to the process of recovering at the surface the excess fluid and sand used to hydraulically fracture an underground formation. The flowback process prepares the well for a subsequent phase of treatment or to transition the well to a production stage. Flowback tanks or frac tanks are used to recover flowback fluid and other fluid that comes back up the well after hydraulic fracturing. The flowback tanks sit at the surface and collect flowback.

A frequent problem that arises is the accumulation of sand and other proppants inside the flowback tank during use, and conventionally these solids must be manually cleaned from the tank. The sand is often contaminated due to hydrocarbons, chemicals and salts passing through the sand. As such, specialized, environmentally approved cleaning services must be used to clean the flowback tank, but these cleaning services can significantly add to the cost of completing a well. Alternatively, flowback tanks can also be removed from the wellsite and cleaned in an offsite facility. This requires removing the tank from the wellsite and transporting the tank to the offsite facility which also adds to the cost, and the tank cannot be utilized while awaiting cleaning.

As is apparent from the above, current cleaning systems and methods for flowback tanks can be improved to reduce the cost of these services. Therefore, there is a need for an improved flowback tank cleaning system and method.

BRIEF SUMMARY OF THE INVENTION

One or more embodiments of the invention enable a flowback tank cleaning system and method.

A flowback tank cleaning system and method is described. An illustrative embodiment of a flowback tank includes a self-cleaning system.

An illustrative embodiment of a tank includes an interior surface comprising a front end, one or more walls, an upper surface and a lower surface, an interior volume comprising a collection receptacle and a sump section, a trough extending longitudinally along the lower surface within the collection receptacle and comprising one or more trough sides that angle inward and downward from said tank wall towards the lower surface, means for conveying solid debris longitudinally along the trough, fluid outlets positioned to direct washing fluid downward towards the means for conveying solid debris, and means for removing the washing fluid from the tank.

In some embodiments, the tank further includes a lift auger coupled to the means for conveying solid debris. In certain embodiments, the fluid outlets are one of nozzles, a series of holes, or a combination thereof, and the washing fluid is one of water or another inert fluid. In some embodiments, the means for conveying the sand longitudinally along the tank is one of a conveyer belt, an auger, or a combination thereof. In some embodiments, the trough includes a vibration system coupled to the trough of the tank. In certain embodiments, one of the trough, the means for conveying sand longitudinally along the tank, or a combination thereof includes one of an anti-friction coating, anti-rust coating, a hydrophobic coating, or a combination thereof. In some embodiments, the means for collecting the washing fluid is the trough angled downwards from a front of the tank towards a sump section, the trough coupled to a drain pipe system. In certain embodiments, the tank further includes a horizontal grating extending between the means for conveying sand and the washing fluid distribution system. In some embodiments, the tank further includes a baffle wall inside the tank and suspended above the means for conveying the sand.

An illustrative embodiment of a flowback tank cleaning method includes moving solid debris collected in an angled trough at a bottom of a collection section of a flowback tank towards a lift auger using a cleaning auger or conveyor belt extending along a length of the collection section, spraying a fluid towards the cleaning auger or conveyor belt through fluid outlets above the cleaning auger, operating the lift auger to remove from the flowback tank the solid debris moved by the cleaning auger or conveyor belt, and removing the fluid from the flowback tank using a system of drain pipes below the cleaning auger or conveyor belt.

In certain embodiments, one of the trough, the cleaning auger, or a combination thereof includes one of an anti-friction coating, anti-rust coating, a hydrophobic coating, or a combination thereof. In some embodiments, the fluid outlets used in the method are spray nozzles attached to a fluid distribution pipe.

In alternative embodiments, other methods or devices could be used to move sand longitudinally through the collection section of the flowback tank. For example, jets of water or some other liquid could be used instead of a cleaning auger or conveyor belt. Such alternative embodiments may also eliminate the need for a trough extending along the lower surface of the collection section.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 4 is a cross sectional view across line 4-4 of FIG. 1 of a flowback tank cleaning system of an illustrative embodiment.

FIG. 4A is an enlarged view of the cleaning system of FIG. 4.

FIG. 5 is a cross sectional view across line 5-5 of FIG. 4 of a flowback tank cleaning system of an illustrative embodiment.

FIG. 7 is a top plan view of a flowback tank grating of an illustrative embodiment.

Figure 1:
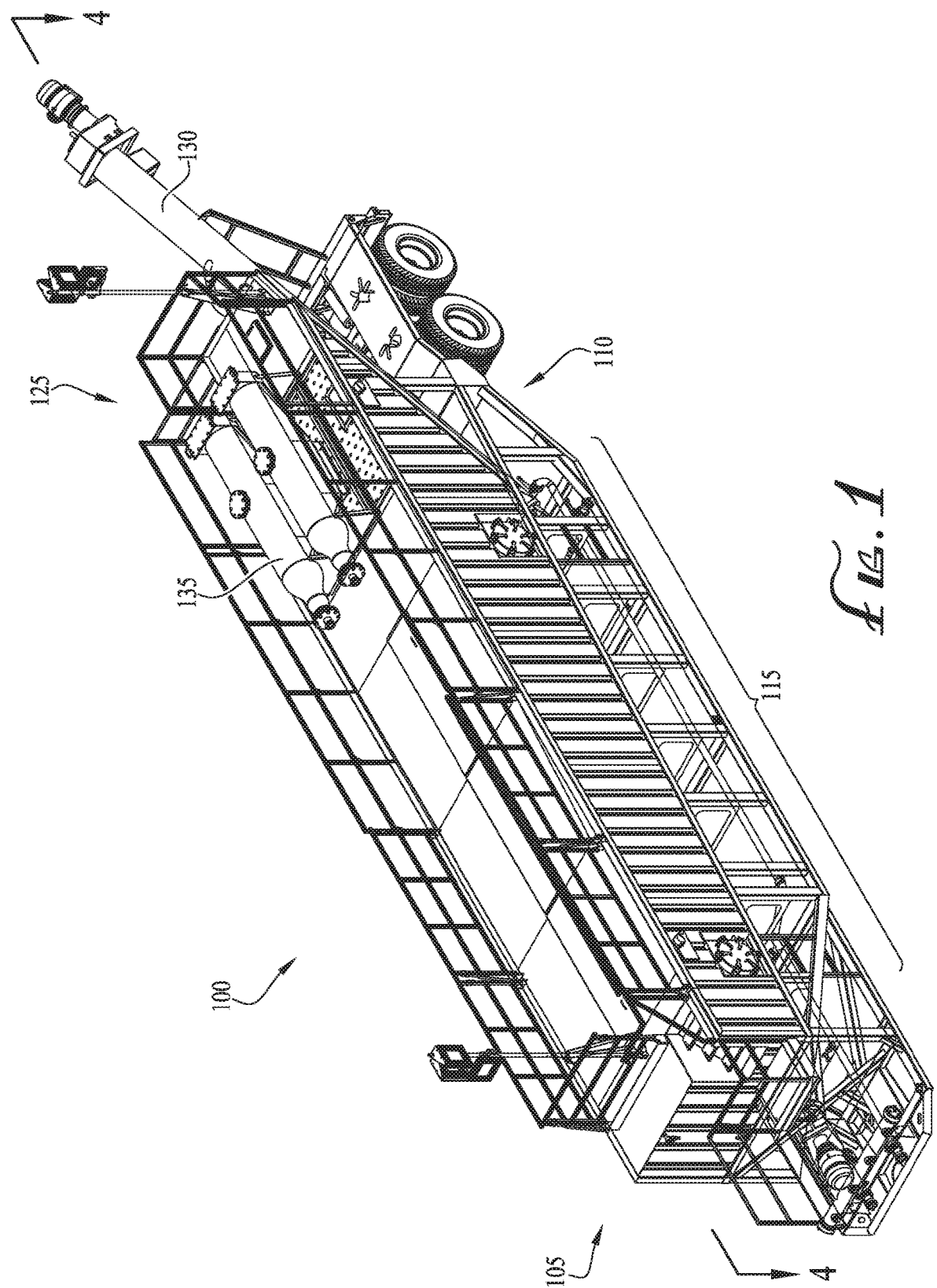
FIG. 1 is a perspective view of a flowback tank of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A flowback tank cleaning system and method is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a pipe includes one or more pipes.

As used in this specification and the appended claims, "coupled" refers to either a direct connection or an indirect connection (e.g., at least one intervening connection) between one or more objects or components. The phrase "directly attached" means a direct connection between objects or components.

As used herein the terms "axial", "axially", "longitudinal" and "longitudinally" refer interchangeably to the direction extending along the length of a flowback tank from the front section towards the sump section, or vice versa.

As used herein "flowback fluid" refers to any mixture of solid, liquid and/or gas used to stimulate and/or hydraulically fracture an underground formation or mixed therewith downhole, and that enters the flowback tank of illustrative embodiments after being recovered to the surface of the underground formation.

As used herein, "sand" is used liberally to refer to any solid or slurry, such as proppant, sand, dirt, and/or abrasive particles, contained in the flowback fluid and entering the flowback tank of illustrative embodiments through the gas busters.

For ease of description and so as not to obscure the invention, illustrative embodiments are primarily described in terms of hydraulic fracturing of an oil and/or gas well. However, the invention is not so limited. Illustrative embodiments may be equally applied to any tank that must be cleaned of sand, dirt, abrasives or other similar contaminants requiring special environmental handling and/or not readily moved from the location of operation.

Illustrative embodiments provide a flowback tank self-cleaning system that may eliminate the need for costly, environmentally approved cleaning services and also may eliminate the need to remove the flowback tank from service during cleaning, which may reduce costs and improve efficiency of flowback tank implementation during hydraulic fracturing operations.

FIG. 1 illustrates a flowback tank of an illustrative embodiment. Flowback tank 100 may be positioned at the surface of a downhole well, shale formation, or other underground formation undergoing formation stimulation and/or hydraulic fracturing operations. Flowback tank 100 may include front end 105 at the front of flowback tank 100, and sump section 110 at the back of flowback tank 100. Collection receptacle 115 may occupy the front and middle sections of flowback tank 100. Sump section 110 may be inclined from collection receptacle 115 towards back side 125 of flowback tank 100 and may include lift auger 130 to remove sand and/or other solids from flowback tank 100. Flowback tank 100 may include gas busters 135, double wall construction, be made of steel, stainless steel and/or metal panels and/or piping, hold up to 60,000 gallons of fluid and/or contain other features well known to those of skill in the art of hydraulic fracturing.

Figure 2:
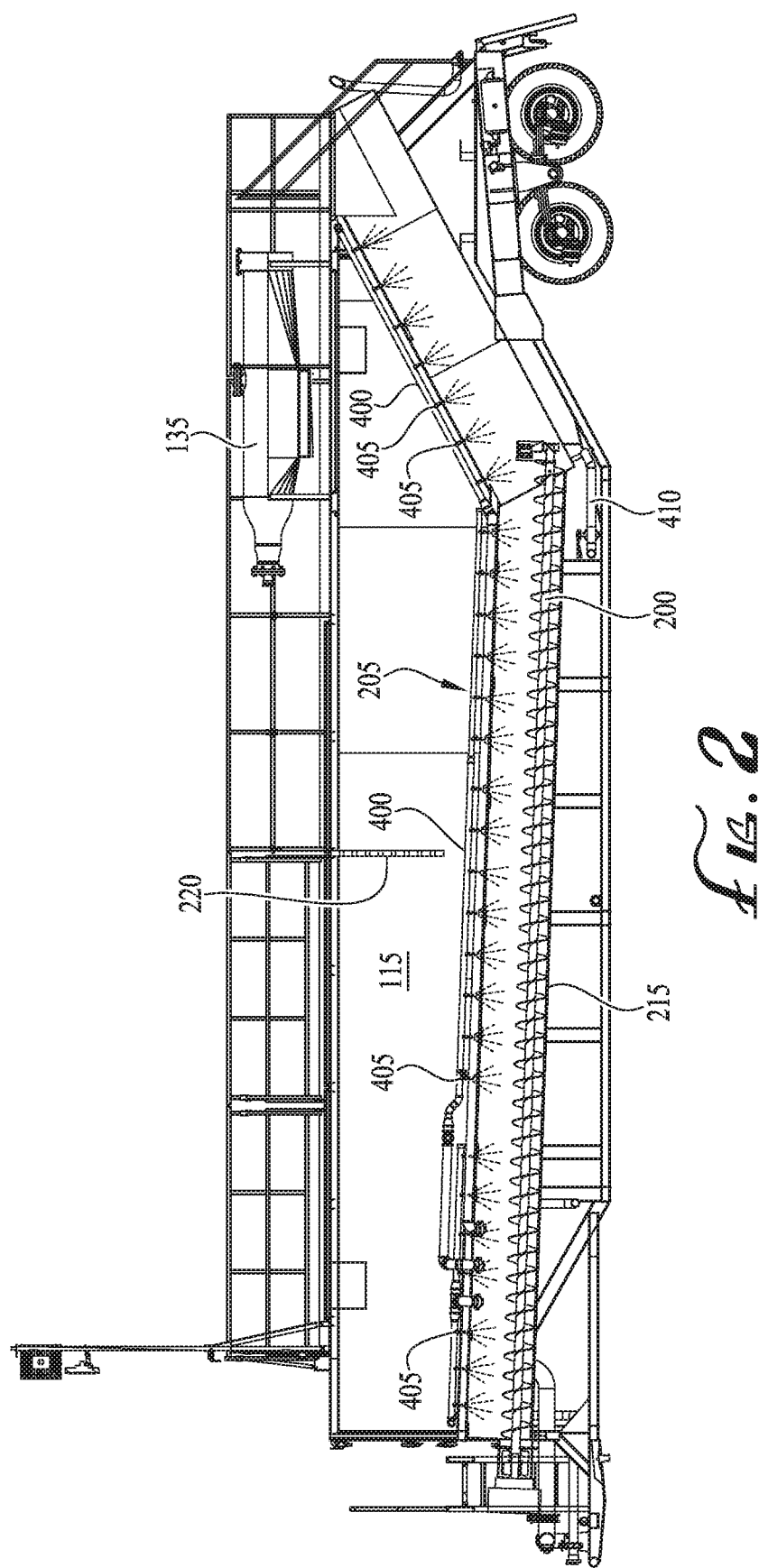
FIG. 2 is a cross sectional view across line 2-2 of FIG. 4 of a flowback tank of an illustrative embodiment.

Turning to FIG. 2, the bottom surface of collection receptacle 115 may include cleaning auger 200 extending longitudinally along trough 215 of collection receptacle 115, and running the length or substantially the length of trough 215. Cleaning auger 200 may be a screw conveyor and include a rotating helical screw blade (fighting) that rotates with a central shaft. Cleaning auger 200 may omit a surrounding tube, and may be operated by a motor as is well known to those of skill in the art. In some embodiments, rather than or in addition to cleaning auger 200, a conveyer belt may be used to move sand towards sump section 110. In addition, a plurality of cleaning augers and/or conveyor belts could be used, which might eliminate the need for a trough and/or a downward-angled bottom surface along the length of collection receptacle 115.

Figure 8:
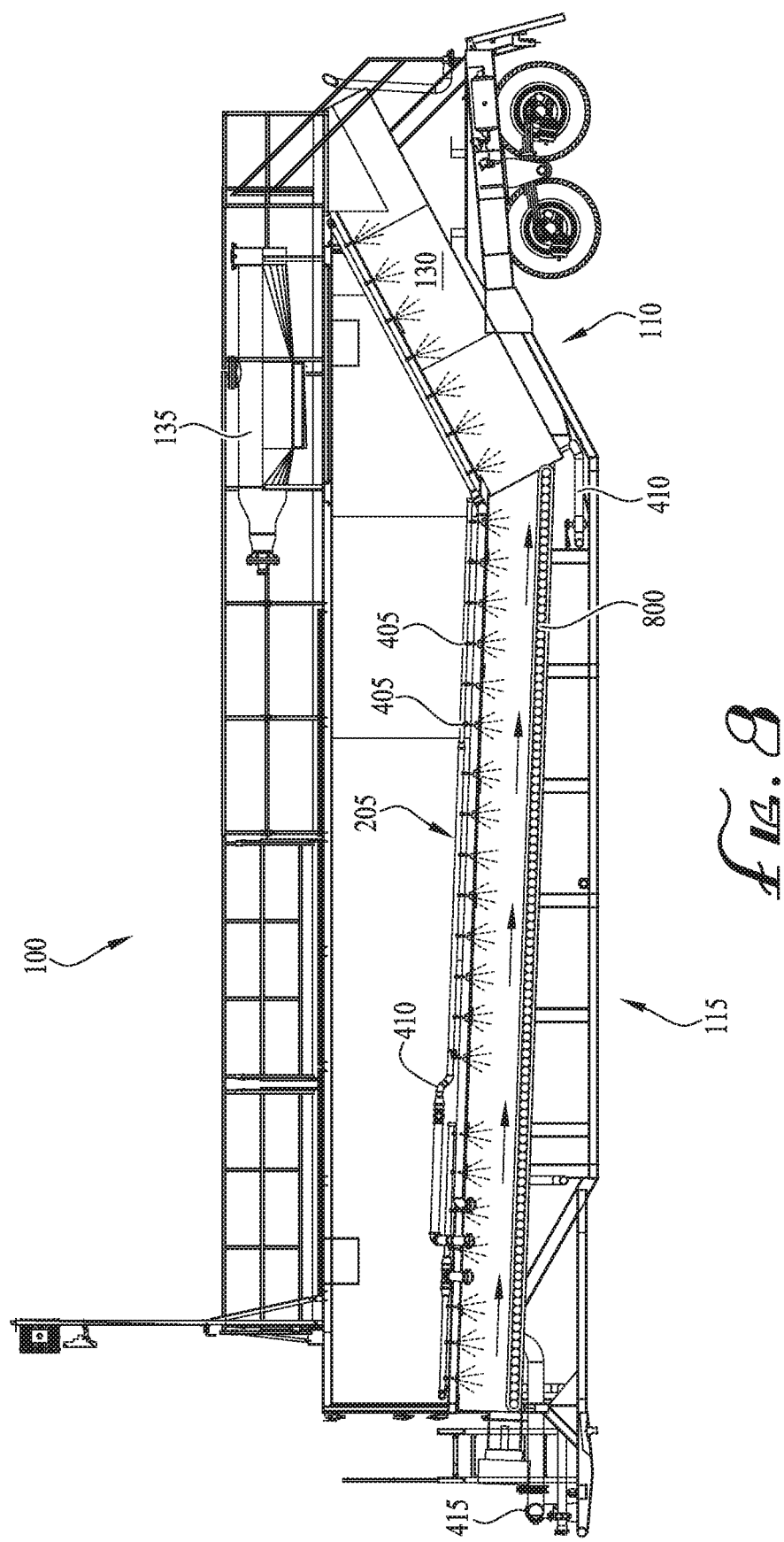
FIG. 8 is a cross sectional view of a flowback tank conveyer of an illustrative embodiment.

FIG. 8 illustrates conveyer belt 800 of an illustrative embodiment. In the embodiment of FIG. 8, conveyer belt 800 is positioned at the bottom of trough 215 and/or on the floor of collection receptacle 115 and may transport sand towards lift auger 130. In some embodiments, lift auger 130 may be replaced by a conveyer belt.

Trough 215, conveyer belt 800 and/or cleaning auger 200 may be slanted downwards longitudinally from front side 105 towards sump section 110, along the length of collection receptacle 115. Longitudinal slant of trough 215 may be gentle. In an illustrative example, cleaning auger 200, conveyer belt 800 and/or trough 215 may be slanted about 2° downward from front end 105 to the intersection of collection receptacle 115 with sump section 110. Slanting of trough 215 in a longitudinal direction may provide gravitational assistance in moving sand towards sump section 110 so the sand may be removed from flowback tank 100. Slanting of trough 215 may assist cleaning fluid in travelling towards the entrance 505 of drain pipe 410. Trough 215 may serve as the floor of collection receptacle 115.

In alternative embodiments, other devices or methods could be used to move sand longitudinally through collection receptacle 115. For example, jets of water or other fluids could be positioned near the front end 105 of the flowback tank, and oriented to spray fluid towards the sump section 110, such that the flow of fluid would result in longitudinal movement of sand.

Similarly, the bottom surface of collection receptacle could be downward-angled from front end 105 to sump section 110, as described above, and also configured to vibrate, such that sand collecting on the bottom surface would be urged to follow the downward slant towards sump section 110.

Figure 3:
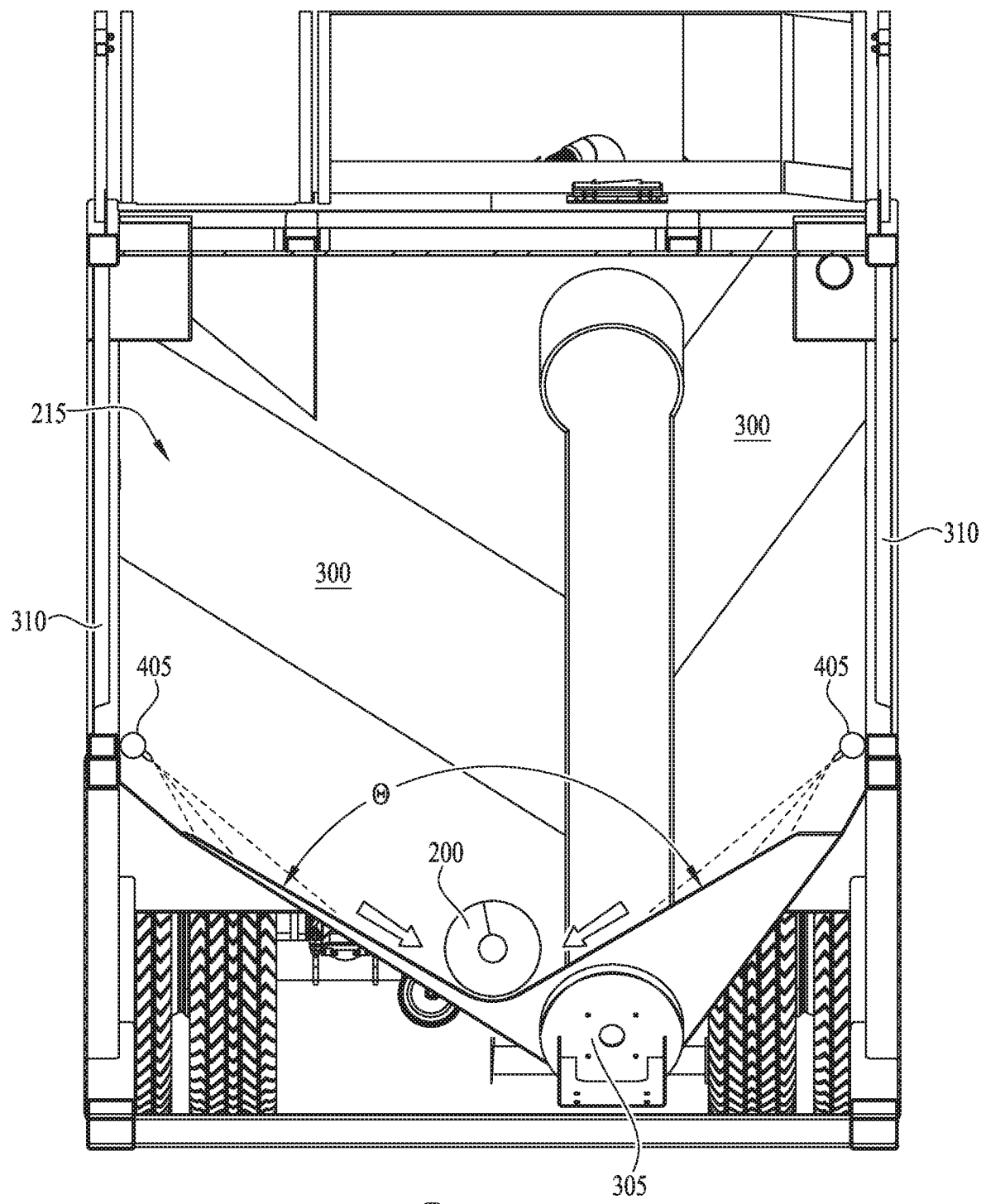
FIG. 3 is a cross sectional view across line 3-3 of FIG. 4 a flowback tank angled floor of an illustrative embodiment.
Figure 9:
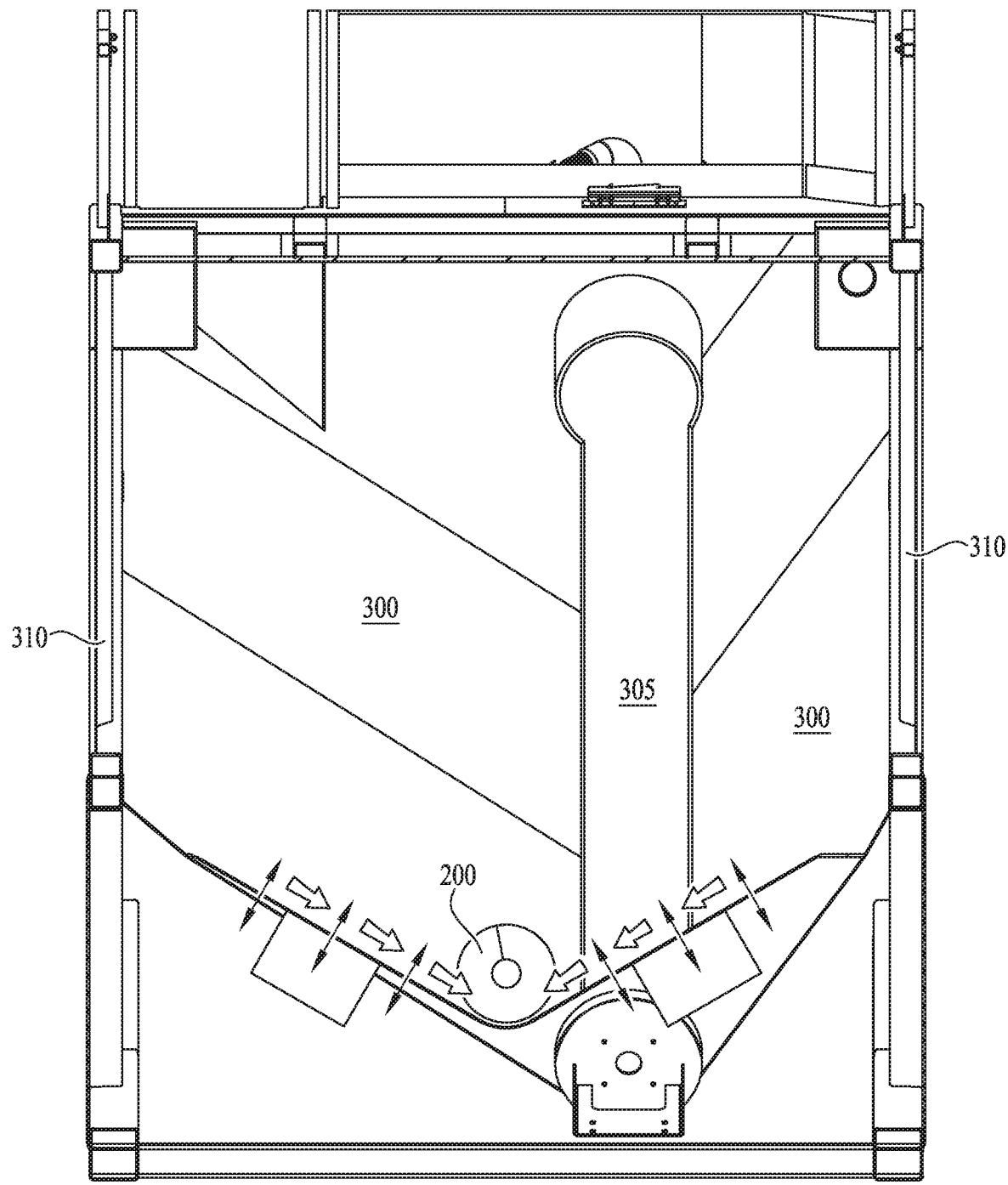
FIG. 9 is a cross sectional view of a vibrating trough of an illustrative embodiment.

FIG. 3 illustrates a collection receptacle trough of illustrative embodiments. As shown in FIG. 3, trough 215 may be substantially V-shaped, with the V-shape formed by two trough sides 300 that angle inward and downward towards the center of collection receptacle 115. Each trough side 300 may angle downwards and inward from one of the opposing tank sides 310, and meet at trough base 305 that may be a corner, rounded corner, bottom, lowest point and/or substantially pointed bottom. In some embodiments, the downward angle of each trough side 300 may be about 30° from horizontal, and/or between 20° and 60° from horizontal and/or the angle θ between first trough side 300 and second trough side 300 may be 120° or about 120°. Trough base 305 may be the lowest point of trough 215, the bottom of trough 215 and/or may be the nadir of trough 215. Cleaning auger 200 may be placed within, at and/or proximate trough base 305 such that sand on trough 215 is funneled and/or falls towards cleaning auger 200. In some embodiments trough 215 may vibrate to assist in moving sand towards cleaning auger 200 and/or conveyer 800. FIG. 9 illustrates a vibrating trough 215 of illustrative embodiments. In certain embodiments, jet nozzle system 205 and/or the shape and orientation of trough 215 may obviate the need for trough 215 vibration.

Trough 215, conveyer belt 800, cleaning auger 200, collection receptacle 115 and/or other portions of flowback tank 100 may be coated with an anti-friction, anti-rust and/or hydrophobic coating. For example, trough sides 300 and/or cleaning auger 200 may be coated. Coatings on surfaces of flowback tank 100 may reduce friction and/or sticking of sand to trough 215 and/or other coated portions, improving the ability of sand to be cleaned, washed, flushed and/or removed from flowback tank 100. The coating on trough 215 may be a diamond-like carbon coating, Teflon, a chemical vapor deposition, physical vapor deposition, high velocity oxygen fuel coating, or another similar anticorrosion, anti-rust and/or anti-friction coating.

Returning to FIG. 2, a system of jet nozzles may be arranged along the length of collection receptacle 115 and/or sump section 110. Jet nozzle system 205 may be arranged above trough 215 and/or may spray water or another cleaning fluid towards trough 215. The sprayed water or inert fluid may clean the sand on trough 215 and/or assist in flushing sand down trough sides 300 towards cleaning auger 200 and/or conveyer 800. FIG. 4 illustrates a jet nozzle system 205 of illustrative embodiments. Jet nozzle system 205 may include one or more fluid supply pipes 400 suspended and/or positioned above cleaning auger 200 and/or conveyor belt 800. Fluid supply pipes 400 may be stainless steel or another similar metal and may be attached to and/or supported by tank sides 310, above trough 215. Fluid supply pipes 400 may include a series of holes spaced along the length of fluid supply pipes 400, through which water may be delivered into collection receptacle 115 and/or flowback tank 100. Nozzles 405 may be positioned on pipes 400 at and/or around the holes such that water or other cleaning fluid sent through pipes 400 is sprayed through nozzles 405 and lands on trough 215, trough sides 300, cleaning auger 200 and/or conveyer belt 800. In some embodiments, nozzles 405 may not be necessary, and water and/or cleaning fluid may be sprayed directly through fluid outlets and/or a series of holes in pipes 400. However, nozzles 405 may assist in broadening and/or directing the spray of fluid exiting holes in fluid supply pipes 400. Drain pipe 410 may collect water or other fluid sprayed by nozzles 405 and/or fluid supply pipes 400 and carry the water or other fluid out of flowback tank 100 through drain manifold 415, which drain manifold 415 may be located at the front side 105 of flowback tank.

Figure 5A:
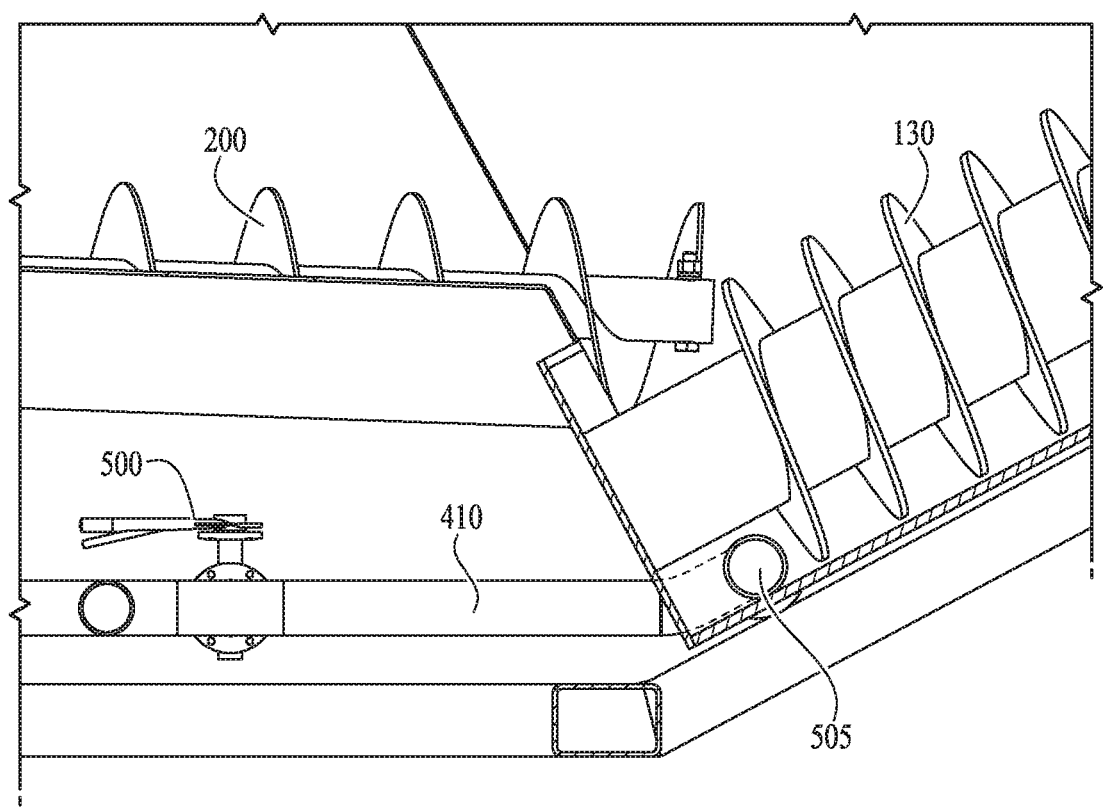
FIG. 5A is an enlarged view of an illustrative drain pipe of the flowback tank cleaning system of FIG. 5.
Figure 6:
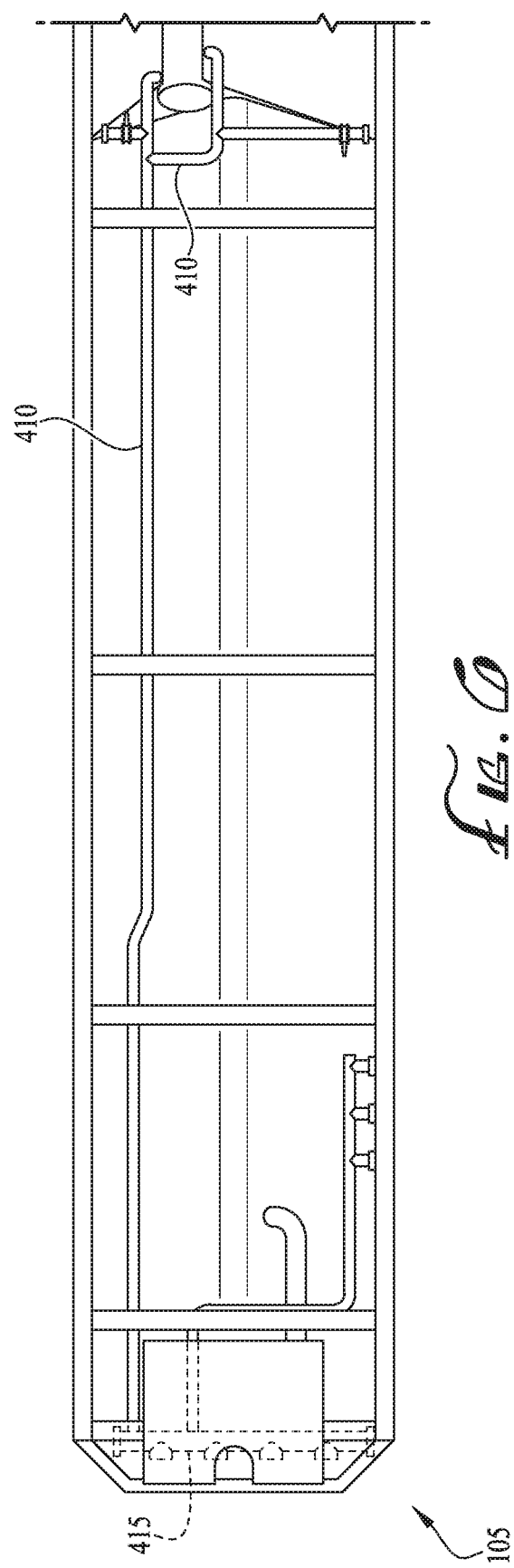
FIG. 6 is a bottom plan view of a flowback tank pipe manifold system of an illustrative embodiment.
Figure 6A:
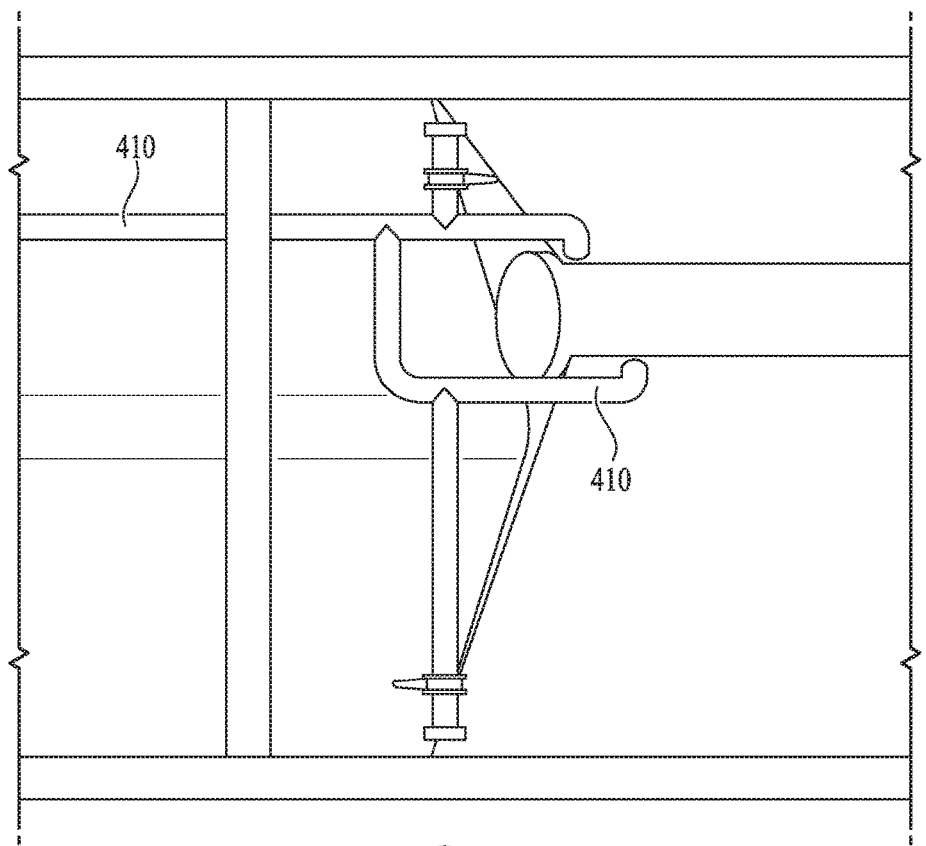
FIG. 6A is a perspective view of a drain pipe of a flowback tank pipe manifold system of an illustrative embodiment.
Figure 6B:
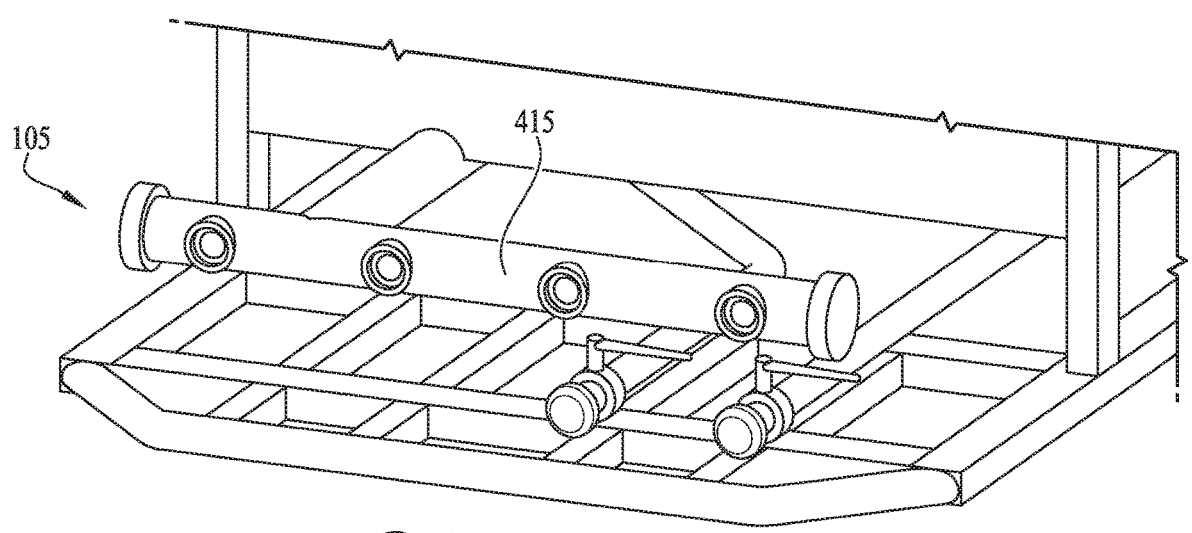
FIG. 6B is a perspective view of a flowback tank pipe manifold system of an illustrative embodiment.

FIG. 5-FIG. 6B illustrate a fluid drain system of illustrative embodiments. While sand may be removed from flowback tank using lift auger 130, fluid may be collected and drained through drain pipe 410. Turning to FIG. 5 and FIG. 5A, one or more drain pipes 410 may collect fluid from flowback tank 100 and/or remove the fluid from collection receptacle 115. Fluid may enter drain pipe 410 at fluid entrance 505 at the intersection of lift auger 130 and cleaning auger 200 and/or the intersection of conveyer belt 800 and lift auger 130. In this manner, fluid flowing down sump section 100 ramp, and also fluid flowing down the longitudinally angled trough 215 may be aggregated at the intersection and removed. Drain pipe 410 may catch water or other cleaning fluid as the water flows down the incline of sump section 110 and/or down the decline of trough 215, such that water and other fluids are carried out drain manifold 415 proximate front side 105, while sand may be carried up and out sump section 110 of flowback tank 100. Valve 500 may assist in controlling and/or directing the flow of fluid through drain pipes 410.

A grating may cover cleaning auger 200 and/or conveyer belt 800. A grating of illustrative embodiments is shown in FIG. 7. Grating 700 may be a perforated metal sheet that extends over the length of cleaning auger 200 and/or conveyer belt 800. Perforations 710 in grating 700 may permit sand and/or liquid to fall through grating 700 towards cleaning auger 200. Grating 700 may improve safety by preventing human access to cleaning auger 200 and/or conveyer belt 800. Grating may be narrower than trough 215, and support structures 705 may extend between tank sides 310 and/or trough sides 300 and grating 700, securing grating 700 in place over auger 200 and/or conveyer 800. Support structures 705 may attach to tank sides 310 and/or trough sides 300 to suspend grating 700 above cleaning auger 200 and/or conveyor belt 800 and below jet nozzle system 205, allowing fluid to flow around and through grating 700.

Returning to FIG. 2, flowback tank 100 may include baffle wall 220. Baffle wall 220 may extend vertically from the top of flowback tank 100, into collection receptacle 115. Baffle wall 220 may be positioned about midway along the length of collection receptacle and terminate about a foot above grating 700, cleaning auger 200 and/or conveyer belt 800, leaving a space between the bottom of baffle wall 220 and the top of grating 700, cleaning auger 200 and/or conveyer belt 800. Baffle wall 220 may be perforated, for example by drill press. During flowback operations, foam may form as a result of chemicals present in the flowback fluid, and sand may become trapped in the foam. Baffle wall 200 may hold the foam back from lift auger 130, until the sand falls out of the foam. Once the sand falls out of the foam, the sand may be funneled by trough 215 towards cleaning auger 200 and/or conveyer 800, and carried out of flowback tank 100 by lift auger 130.

Illustrative embodiments provide a self-cleaning flowback tank. Flowback tank 100 may include cleaning auger 200 and/or conveyer belt 800 positioned at the base 305 and/or bottom of slanted and angled trough 215, and spray jet nozzle system 205 that flushes sand towards the cleaning auger 200 and/or conveyer belt 800. One or more features of illustrative embodiments may flush and clean sand from flowback tank 100, eliminating the need for specialized environmental cleaning services and/or removal of the flowback tank from the field for cleaning, which may save cost and time and improve efficiency of hydraulic fracturing operations.

An improved flowback tank cleaning system and method has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A flowback tank cleaning method comprising:
   receiving in a flowback tank fluid used in hydraulic fracturing of an underground formation, said fluid including solid debris;
   collecting solid debris from the fluid in an angled trough at a bottom of a collection section of the flowback tank;
   moving said solid debris towards a lift auger using a cleaning auger extending along a length of the collection section;
   spraying a fluid towards the cleaning auger and the collected solid debris through fluid outlets attached to the flowback tank above the cleaning auger;
   operating the lift auger to remove from the flowback tank the solid debris so moved by the cleaning auger; and
   removing the fluid from the flowback tank using a system of drain pipes below the cleaning auger.

2. The flowback tank cleaning method of claim 1, further comprising the step of coating at least a portion of the trough with an anti-friction coating.

3. The flowback tank cleaning method of claim 1, further comprising the step of coating at least a portion of the cleaning auger with an anti-friction coating.

4. The flowback tank cleaning method of claim 1, wherein the fluid outlets are spray nozzles attached to holes in a fluid distribution pipe.

5. A flowback tank cleaning method comprising:
   receiving in a flowback tank fluid used in hydraulic fracturing of an underground formation, said fluid including solid debris;
   collecting solid debris from the fluid in an angled trough at a bottom of a collection section of the flowback tank;
   moving said solid debris towards a lift auger using a conveyer belt extending along a length of the collection section;
   spraying a fluid towards the conveyor belt and the collected solid debris through fluid outlets attached to the flowback tank above the belt;
   operating the lift auger to remove from the flowback tank the solid debris so moved by the conveyer belt; and
   removing the fluid from the flowback tank using a system of drain pipes below the conveyer belt.

6. The flowback tank cleaning method of claim 5, further comprising the step of at least partially coating the collection section with an anti-friction coating.

7. The flowback tank cleaning method of claim 5, wherein the fluid outlets are spray nozzles attached to holes in a fluid distribution pipe.

* * * * *